(12) United States Patent
Kokumai et al.

(10) Patent No.: US 8,577,807 B2
(45) Date of Patent: Nov. 5, 2013

(54) METHOD FOR PROTECTING SECRET INFORMATION IN A SYSTEM FOR REPORTING AN EMERGENCY WHEN SECRET INFORMATION IS ACCESSED

(75) Inventors: Hitoshi Kokumai, Kobe (JP); Ryuhei Masuno, Osaka (JP); Masayuki Kuriyama, Asiya (JP)

(73) Assignee: Mnemonic Security Limited, Osaka (JP)

(\*) Notice: Subject to any disclaimer, the term of this patent is extended or adjusted under 35 U.S.C. 154(b) by 1321 days.

(21) Appl. No.: 11/731,610

(22) Filed: Mar. 30, 2007

(65) Prior Publication Data
US 2009/0328162 A1 Dec. 31, 2009

Related U.S. Application Data

(62) Division of application No. 10/333,868, filed as application No. PCT/JP01/06356 on Jul. 23, 2001, now abandoned.

(30) Foreign Application Priority Data

Jul. 25, 2000 (JP) .................................. 2000-223940
Sep. 20, 2000 (JP) .................................. 2000-284811
Dec. 27, 2000 (JP) .................................. 2000-396990

(51) Int. Cl.
*G06Q 99/00* (2006.01)
(52) U.S. Cl.
USPC ......................................................... 705/50
(58) Field of Classification Search
USPC ......................................................... 705/50
See application file for complete search history.

(56) References Cited

U.S. PATENT DOCUMENTS 5,265,163 A * 11/1993 Golding et al. ................. 726/19
5,321,242 A * 6/1994 Heath, Jr. ....................... 235/382
5,354,974 A * 10/1994 Eisenberg ...................... 235/379

(Continued)

FOREIGN PATENT DOCUMENTS

| GB | 2313460 A | * 11/1997 |
| JP | 2000-223940 | * 7/2000 |
| JP | 2000-284811 | * 9/2000 |
| JP | 2000-396990 | * 12/2000 |

*Primary Examiner* — James D Nigh
(74) *Attorney, Agent, or Firm* — DLA Piper LLP (US)

(57) ABSTRACT

Disclosed are protection of secret information in a system for reporting an emergency such as theft or confinement when secret information is accessed. Secret information includes a large quantity of data and a piece/pieces of true and correct data mixed into the data. The secret data including the data and the true and correct data is two-dimensional code data the code of which is composed of groups of cells having different areas. The positions and order of storage of the true and correct data dispersedly mixed in the data are determined and reported to the user. The user adds a predetermined alerting signal when inputting the password to tell that the user is under control of a third party. The system can detect the alerting signal and know that the user is in an abnormal state, performs normal identification procedures, and takes protection/preservation measures. Part of data is specified as confinement report data and added to the true and correct data. Consequently at least a piece of confinement report data is included and therefore the user himself is judged to be under control of the third party. Then the user is identified and a confinement report alert is issued.

3 Claims, 19 Drawing Sheets

(56) References Cited

U.S. PATENT DOCUMENTS

| | | | |
|---|---|---|---|
| 5,559,961 A * | 9/1996 | Blonder | 726/18 |
| 5,731,575 A * | 3/1998 | Zingher et al. | 235/379 |
| 6,045,039 A * | 4/2000 | Stinson et al. | 235/379 |
| 6,990,588 B1 * | 1/2006 | Yasukura | 713/186 |
| 7,363,503 B2 * | 4/2008 | Solioz | 713/184 |
| 2001/0037468 A1 * | 11/2001 | Gaddis | 713/202 |

* cited by examiner (a)

(b)

(c)

(a)

(b)

(c)

METHOD FOR PROTECTING SECRET INFORMATION IN A SYSTEM FOR REPORTING AN EMERGENCY WHEN SECRET INFORMATION IS ACCESSED

TECHNICAL FIELD

The present invention relates to security of secret information including cryptographic keys. In addition, the present invention relates to a protection system (for example, emergency conditions informing system) for use of secret information including cryptographic keys (for example, use of user authentication passwords).

More particularly, the present invention relates to security of secret information including cryptographic keys (such as personal identification information for user authentication, information indicating a particular authorized user to enter an information control room or to identify an operator, individual identification information for a customer, sensitive personal information (assets, value of securities, and storage data such as storage space), sensitive corporate information [sales activity materials (such as customer data and merchandise data) and research activity materials (such as mathematical expressions, chemical formulas, and other numeric data in research result lists and details in research reports)].

For example, it relates to cryptographic keys used for user authentication in electronic commerce as well as those used to protect secret information stored in a personal computer or mobile telephone against loss and theft and those used as entrant-limited control or operator-limited control cryptographic keys to inhibit an unauthorized person's access to a storage medium of a server.

In addition, the present invention is not limited to online applications such as user authentication in electronic commerce but can be used in offline applications such as recording on a recording medium, transporting printout or image outputs through facsimile or by mail, and transporting and storing in movable or storable form such as printed matter or floppy disks as well as other wide applications such as storing on a recording medium of a computer.

BACKGROUND ART

To protect these kinds of secret information, passwords of plural digits and/or characters and/or IC cards have been commonly used. In addition to or in place of such prior passwords, there exists user authentication means for authenticating a user by means of fingerprints or other physical features. Such an IC card may be used by someone other than the owner or authorized user of the IC card if it is lost or stolen.

In addition, as a prior safety measure against loss and theft of an authentication card which has secret information with cryptographic keys recorded thereon, an authentication request from an unauthorized person may be denied to reject an online connection made by that person, resulting in a transaction failure. However, there is no system to actively invalidate an electronic key (authentication card) used for an unauthorized access or inform that there occurs an unauthorized access to a restricted area or electronic device.

Therefore, if an authentication card which has secret information with cryptographic keys recorded thereon is lost, replicated, and/or stolen, there is no safety measure to be taken when the card is used fraudulently by an unauthorized person in bad faith, when a deceitful user authentication request is made by an unauthorized person in bad faith, or when an authorized user placed under the control of an unauthorized person in bad faith makes a user authentication request (authentication data entry).

It is an object of first and second embodiments of the present invention to provide means of concealing and storing secret information as well as a method of protecting secret information, wherein these means and method have functions as user authentication means but do not need fingerprint recognition or other physical feature user authentication means. It is also an object of these embodiments to provide means of concealing, recording, and storing secret information such as corporate information and technical information.

It is an object of a third present invention to detect access from an authorized user placed under the control of an unauthorized person in bad faith to allow for protection and preservation of both the user and the system.

It is an object of fourth through ninth invention to establish an alarm system and a system for informing that there occurs an unauthorized access to a restricted area or electronic device as a safety measure to be taken when secret information with cryptographic keys, a recording medium including such secret information, or an electronic and/or communication device having such a recording medium is stolen or lost, or fraudulently used by means of an invalid authentication card or leaked authentication data.

DISCLOSURE OF INVENTION

The first invention provides a Secret Information Record Medium for secret information, wherein a single or plural items of true data are interspersed among numerous items of false data and the false and true data are composed of two-dimensional code data in plural groups having different areas, and wherein the location(s) and/or storing order of the item(s) of true data interspersed among the numerous items of false data are determined and presented to a user.

The second invention provides a Secret Information Protective storing Method, wherein a single or plural items of true data encrypted by applying two-dimensional codes to secret information are interspersed among numerous items of false data, and wherein the location(s) and/or storing order of the item(s) of true data with respect to the numerous items of false data are held in a user's memory based on meaningful information for memory authentication (brain authentication) to prevent any unauthorized person from decrypting the secret information.

The third invention provides a Secret Information Protective storing Method wherein items of true data indicating decryption keys for encrypted secret information are interspersed among numerous items of false data for concealment and the locations and reading order of the items of true data interspersed among the numerous items of false data are held in a user's memory.

The fourth invention provides a Secret Information Protective storing method of concealing, recording, and storing secret information interspersed with true information and false information, wherein the true information is divided into plural items and interspersed among numerous items of the false information to conceal the true information, wherein numerous items of true data indicating the locations of the items of true information and numerous items of false data indicating the locations of the items of false information are provided, and wherein the locations and storing order of the items of true data interspersed among the numerous items of false data are determined from a user's memory.

The invention is achieved by referring to a graphic sheet which includes coloring, illustrations, graphics, and landscapes, when the locations and order of the items of true data interspersed among the numerous items of false data are determined from a user's memory.

The eighth invention provides a and System for Reporting Emergency such as Theft or conferment when Secret Information is accessed, wherein the number of items of matching data to be recorded on a recording medium is selected to include a single item of true data and plural items of false data to provide a user authentication data recording medium which has the matching data interspersed with the single item of true data and the plural items of false data, wherein in recording secret information with cryptographic keys on the user authentication data recording medium, one of the numerous items of matching data is determined to be the true data and the remaining items of matching data are determined to be the false data, wherein information indicated by the single item of true data is determined to be authentication data indicating the secret information with the cryptographic keys on the user authentication data recording medium, wherein in using the user authentication data recording medium to enter the authentication data, the single item of true data is selected from the user authentication data recording medium, thereby determining that the true authentication data is selected and validating the user authentication, and wherein in selecting the single item of true data from the user authentication data recording medium during the input operation by means of the user authentication data recording medium, if at least one item of false data is included in the input data, it is determined that a theft-causing unauthorized access is attempted and then the user authentication is invalidated with a theft alarm generated.

The ninth invention is achieved by including plural items of true data in the user authentication data recording medium. More specifically, several ones of the numerous items of matching data are determined to be the true data by specifying the locations and order of them, the remaining items of matching data are determined to be the false data, and information indicated by the plural items of true data is determined to be authentication data on the user authentication data recording medium. Thus, the plural items of true data are selected from the user authentication data recording medium in a correct order during the input operation by means of the user authentication data recording medium, thereby determining that the true matching data is selected and validating the user authentication.

The tenth invention is achieved by determining some of the false data as confinement informing data and adding it to the true data to include at least one item of confinement informing data, thereby determining that the user is placed under the control of an unauthorized person and validating the user authentication with a confinement informing alarm generated.

More specifically, in recording secret information with cryptographic keys on the user authentication data recording medium, one or several ones of the numerous items of matching data are determined to be the true data with a reading order determined, the remaining items of matching data are determined to be the false data, information indicated by the single or plural items of true data in the correct reading order is determined to be authentication data indicating the secret information with the cryptographic keys on the user authentication data recording medium, and some of the false data is determined to be confinement informing data. During the input operation by means of the user authentication data recording medium, the single or plural items of true data from the matching data and the reading order are selected and the confinement informing data is added, thereby determining that the true authentication data is selected and validating the user authentication. Then, if at least one item of confinement informing data is included in addition to the true data, it is determined that the user is placed under the control of an unauthorized person and a control center validates the user authentication with a confinement informing alarm generated.

BEST MODE FOR CARRYING OUT THE INVENTION

Figure 1:
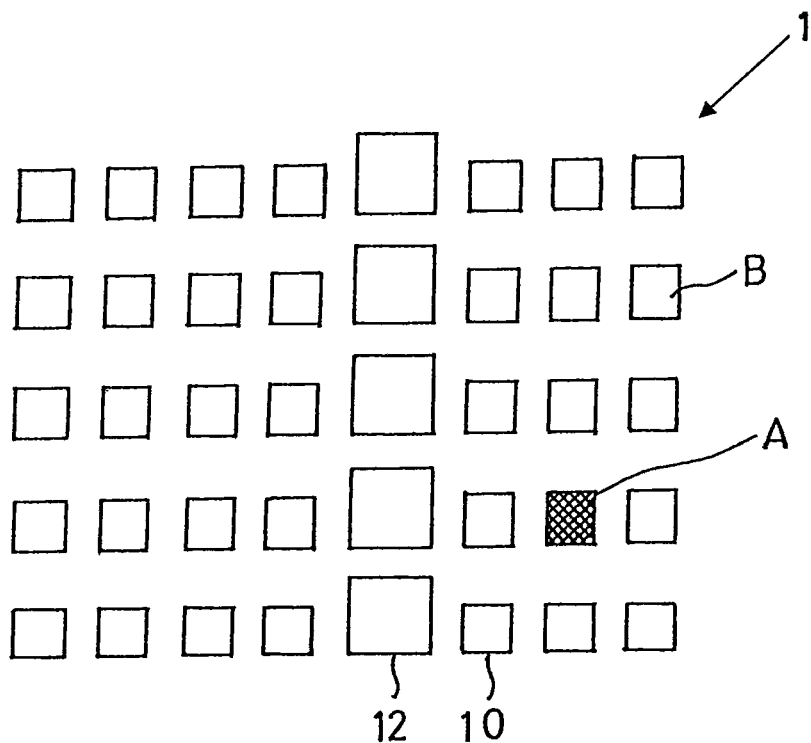
FIG. 1 is an explanatory drawing for showing a first embodiment of a recording and storage card which includes secret information composed of two-dimensional code data.

According to the invention, a user who holds a recording and storage card including secret information of two-dimensional code data composed of a single or plural items of true data interspersed among numerous items of false data, determines and selects the location(s) and the reading order of the item(s) of true data among the numerous items of false data from the user's own memory, so that the secret information of two-dimensional data is reproduced and provided to a computer directly or through a communication line.

In the invention, the user refers to illustrations or graphics composed of the numerous items of false data and true data as auxiliary means, in determining and selecting the locations and the reading order of the items of true data among the numerous items of false data from the user's own memory.

In the invention, the user also refers to illustrations or graphics which exist in the background to the numerous items of false data and true data, in determining and selecting the locations and the reading order of the items of true data among the numerous items of false data from the user's own memory.

According to the invention, the location(s) and the storing order of the single or plural items of true data with respect to the numerous items of false data are determined from the user memory authentication (brain authentication) to select the single or plural items of true data interspersed among the numerous items of false data, so that the secret information with cryptographic keys is decrypted for reproduction.

According to the embodiment, the user determines and selects the locations and the reading order of the items of true data which indicate decryption keys, from among the numerous items of false data from the user's own memory in decrypting the encrypted secret information.

According to the embodiment, the locations and the order of the items of true data for true information interspersed among the numerous items of false data are determined from the user's memory, the determination from the user's memory is accomplished by using, as auxiliary means, a graphic sheet which includes coloring, illustrations, graphics, and landscapes.

Now, the present invention will be described below in detail with reference to the drawings.

Referring to FIGS. 1 through 4, the reference numeral 1 designates a recording and storage card including secret information, on which a single or plural items of true data A are interspersed among numerous items of false data B and the false data B and the true data A are encrypted by applying two-dimensional codes thereto.

The single or plural items of true data A and the numerous items of false data B are arranged in groups of different sizes. Therefore, all the items of false data B and true data A cannot be identified visually. Recorded data items of two-dimensional codes may be different from each other or some of the recorded data items may be in a group of numerous identical data items.

Moreover, the items of false data B and true data A may be in identical shape (for example, a square) or in different shapes such as a square, a rectangle, and a circle and such different shapes may allow the user to hold the locations of the items of true data A in the user's memory more easily. For this purpose, it is assumed that any difference in size or shape is irrelevant to whether the data is true or false and thus, the data cannot be authenticated based on any difference in size or shape.

FIG. 1 shows that a single item of true data A and numerous other items of data are in identical shape (for example, a square) but of two different sizes, that is, larger squares and smaller squares.

Referring to FIG. 1, it is assumed that a collection of first unit records 10 and second unit records 12 represents an apartment house, the second unit records 12 represent collectively a staircase and/or elevator, and the first unit records 10 represent dwellings in the apartment house.

To locate cryptographic keys, it is also assumed that the second dwelling on the right side of the staircase on the second floor is the item of true data A and all the others are items of false data B.

Figure 2:
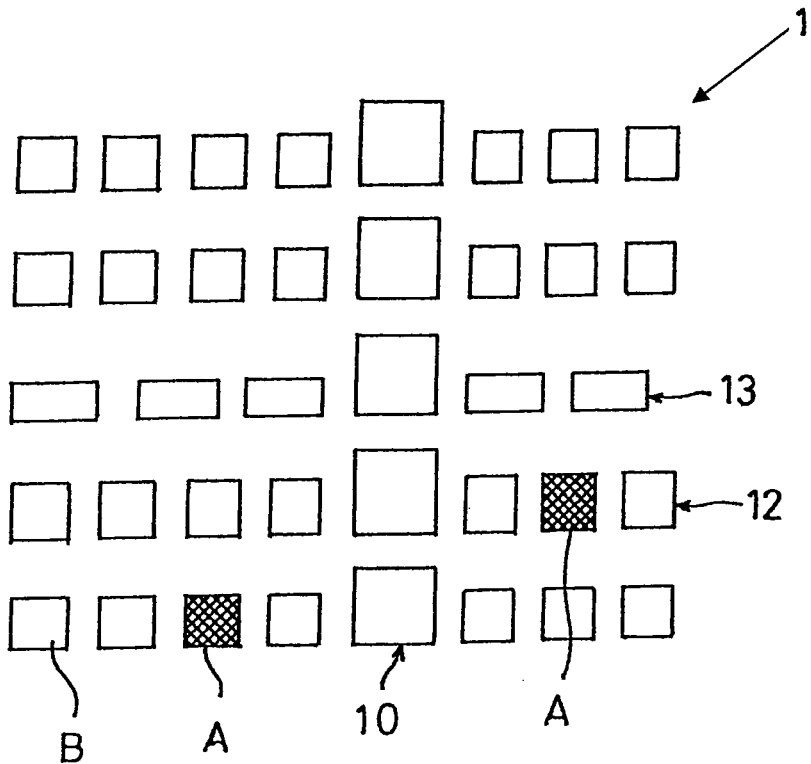
FIG. 2 is an explanatory drawing for showing a second embodiment of the card.

FIG. 2 shows that plural items of true data A and other items of data are represented by squares and rectangles as three types of unit records, that is, first unit records 10, second unit records 12, and third unit records 13.

The first unit records 10 in smaller square shape represent dwellings, the second unit records 12 in larger square shape represent collectively a staircase and/or elevator in a similar manner to FIG. 1, and the third unit records 13 in rectangular shape represent collectively an anti-disaster floor in order to facilitate holding in a user's memory where the items of true data A are located.

Figure 3:
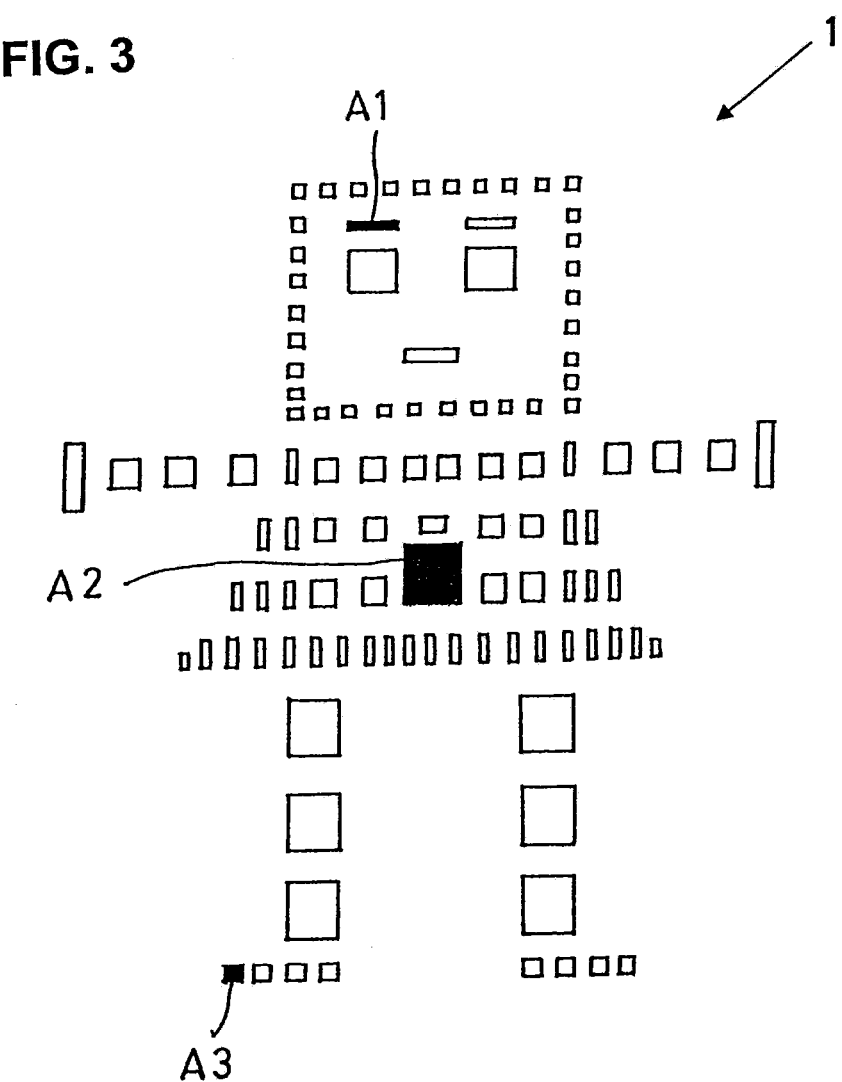
FIG. 3 is an explanatory drawing for showing a third embodiment of the card.

FIG. 3 shows the embodiment and that a "robot" is represented as an illustration or graphic formed of numerous items of false data and true data.

To determine and select the locations of the items of true data interspersed among the numerous items of false data from a user's memory, it is assumed that a rectangle "above the robot's left eye" represents a first item of true data A1, a larger square "in the middle of the robot's belly" represents a second item of true data A2, and a smaller square at the toe of "the robot's left leg" represents a third item of true data A3.

Such auxiliary means as the robot's "eye", "belly", and "leg" can be used to facilitate determination of the locations of the items of true data and the order of selecting them from the numerous items of false data.

Figure 4:
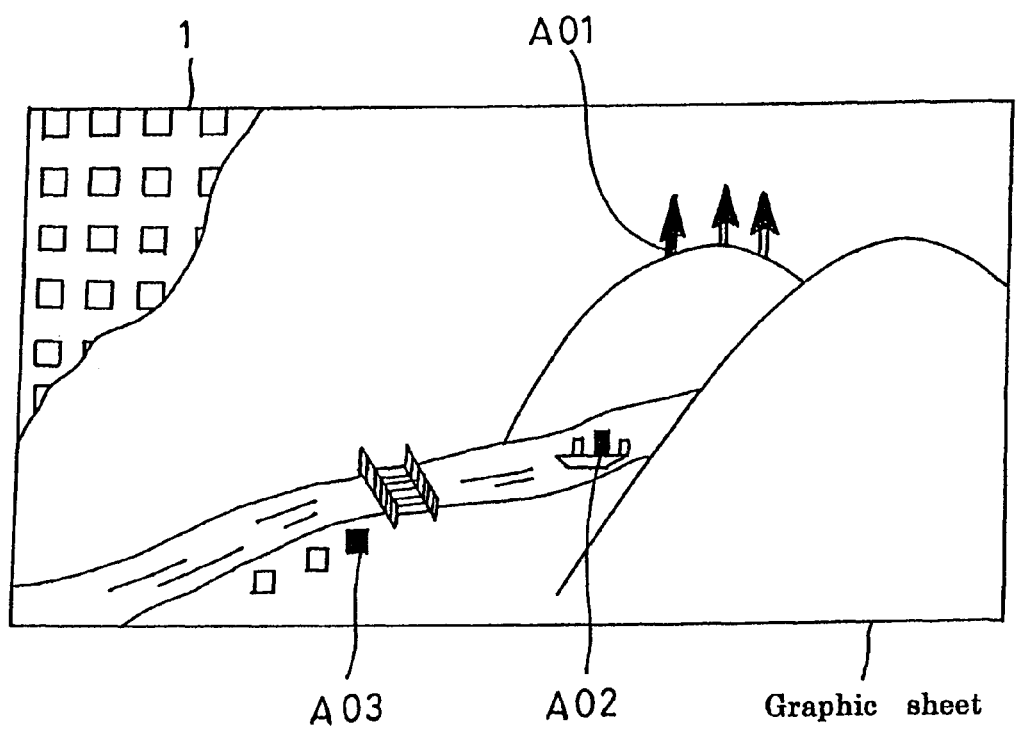
FIG. 4 is an explanatory drawing for showing a fourth embodiment of the card.

FIG. 4 shows the embodiment that a landscape is represented as a background to the numerous items of false data and true data.

In the figure, the landscape is placed over the graphics formed of a collection of the numerous items of false data and the items of true data interspersed among them. It should be noted that a landscape sheet with the landscape printed on a transparent sheet can be placed over a data sheet with the collection of the numerous items of false data and true data displayed thereon to overlay or superimpose the landscape.

To determine and select the items of true data interspersed among the numerous items of false data from a user's memory, it is assumed that a rectangle in the leftmost one of "three pine trees on a mountain" represents a first item of true data A01, a larger square in the cargo on an "on-river ship" represents a second item of true data A02, and a smaller rectangle nearest to a bridge among "three stones near the bridge" represents a third item of true data A03.

Such auxiliary means as the "trees on a mountain", "on-river ship", and "stones near the bridge" can facilitate determination of the locations of the items of true data and the order of selecting them from the numerous items of false data.

Next, data obtained by applying two-dimensional codes will be described below with reference to FIG. 5.

The two-dimensional codes include grid-arranged (matrixed) squares or rectangles, concentrically-arranged circles, and multilevel bar codes and it has the advantages that, as compared with one-dimensional bar codes of data units, the amount of information can be increased in a series manner because of its two-dimensional arrangement, that numerous different items of data can be visually approximated by making a change to a data unit to vary the data to be displayed, and that numerous items of data with different sizes and shapes can be also considered as identical items of data. The first embodiment of the present invention makes use of these advantages.

Figure 5:
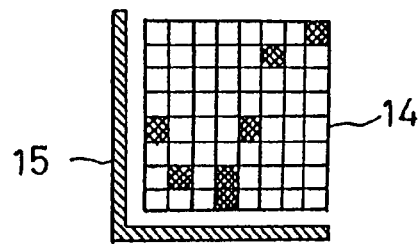
FIG. 5 is an explanatory drawing of two-dimensional codes, which are composed of small squares in FIG. 5a, large squares in FIG. 5b, and rectangles in FIG. 5c, respectively.
Figure 5:
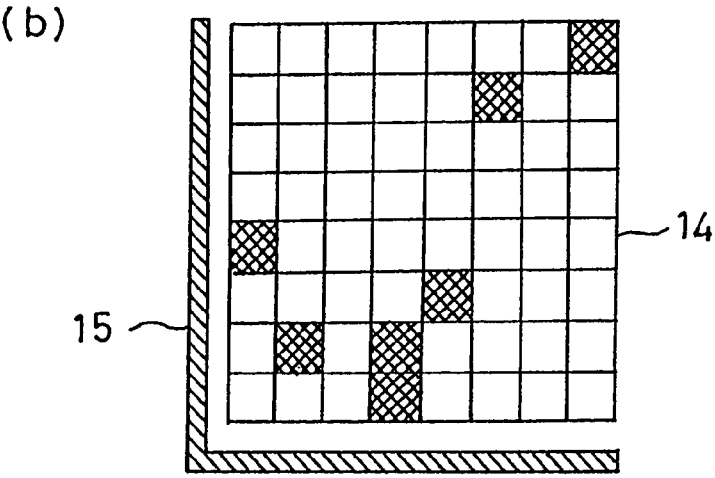
Figure 5:
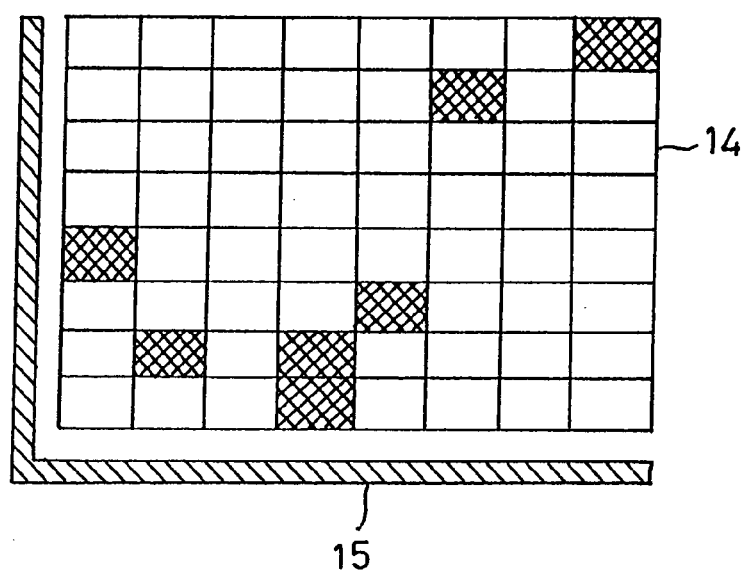

In FIG. 5, the two-dimensional codes are composed of grid-arranged (matrixed) squares or rectangles, that is, smaller squares in FIG. 5a, larger squares in FIG. 5b, and rectangles in FIG. 5c, and the respective recorded items of two-dimensional data indicate an identical numerical value or mark throughout the three figures. In addition, the reference numeral 14 designates a border of data range and 15 designates two-dimensional code data.

In the above-described embodiment, coloring can facilitate determination of the locations of the items of true data and the order of selecting them from the numerous items of false data in recording the data on a recording medium or in printed form.

Next, the second embodiment will be described below.

Figure 6:
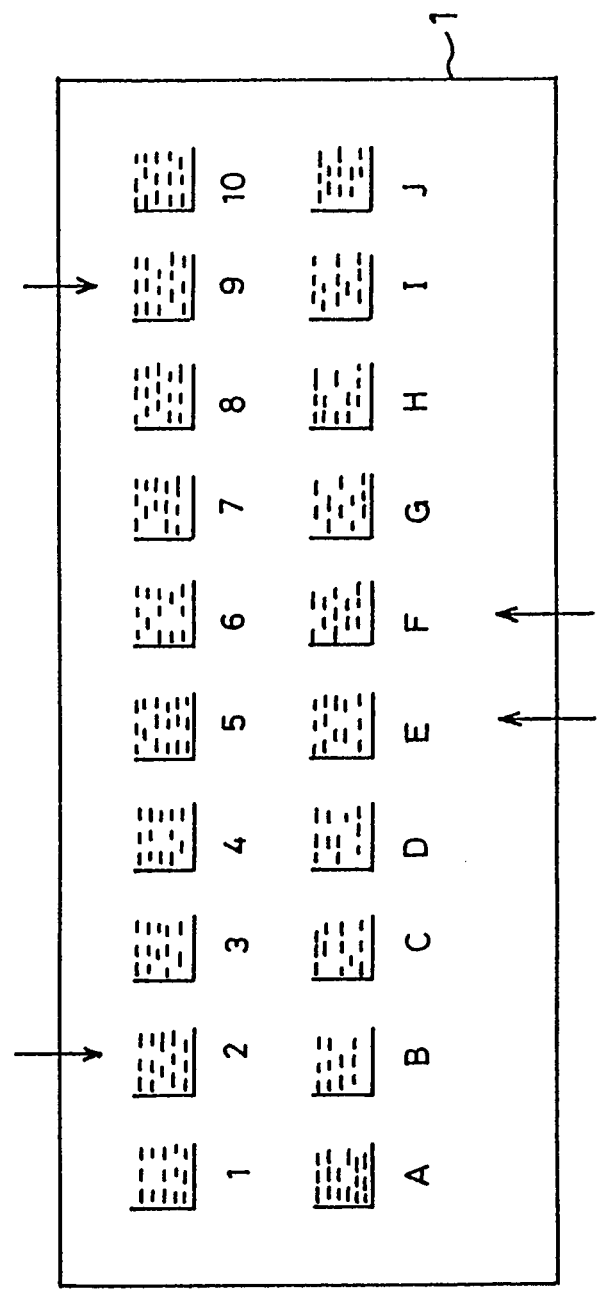
FIG. 6 is an explanatory drawing for showing a fifth embodiment of the recording and storage card which includes secret information composed of two-dimensional code data.

According to another embodiment, some items of true data encrypted by applying two-dimensional codes to secret information with cryptographic keys are interspersed among numerous items of false data, and the locations of the item of true data with respect to the numerous items of false data are held in a user's memory for memory authentication (brain authentication) to prevent any unauthorized person from decrypting the The second through fourth embodiments can be implemented by using a recording and storage card for secret information with cryptographic keys encrypted by two-dimensional data according to the first embodiment and another recording and storage card for secret information with cryptographic keys encrypted by two-dimensional data as shown in FIG. 6 can be also used.

In a card shown in FIG. 6, two-dimensional data for each item of data is in identical shape, that is, a square of the same size. A sequence of alphanumeric characters are added for assisting in holding the locations and reading order of the items of true data in a user's memory. It should be noted that alphanumeric characters (for example, B2, B1, F1, F2, F3, . . . ) may be added to the cards shown in FIGS. 1 and 2 as memory assistance for the locations and reading order of the items of true data.

Figure 7:
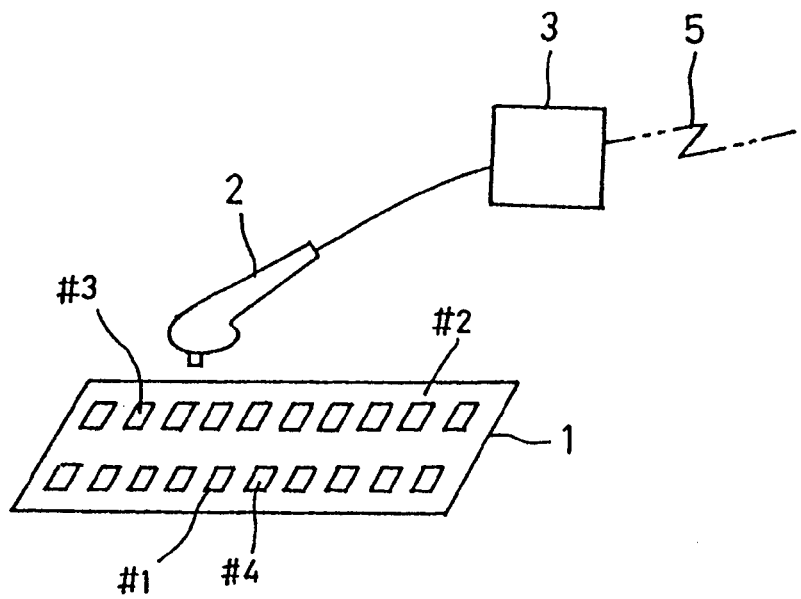
FIG. 7 is a schematic drawing for showing recording and reading operations on a card 1.
Figure 8:
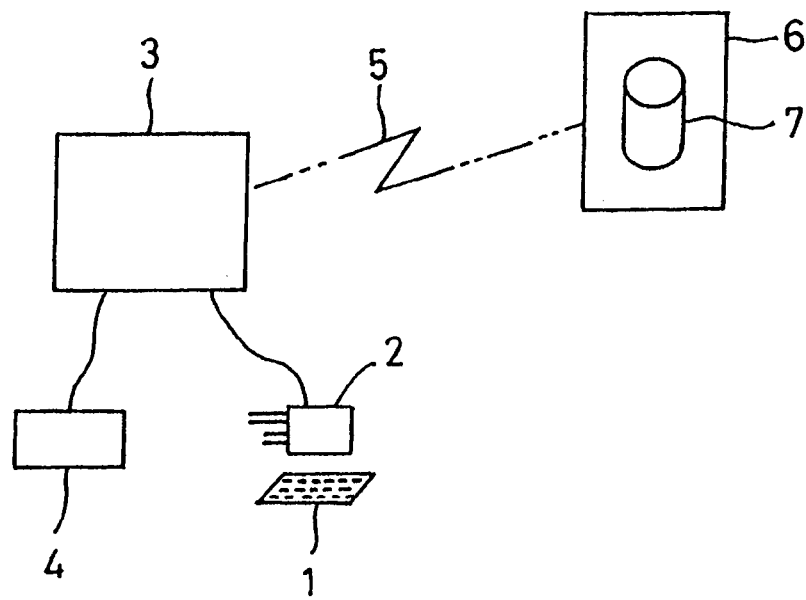
FIG. 8 is a block diagram for showing the same operations as shown in FIG. 7.

Referring to FIGS. 7 and 8, recording and reading operations on a card 1 will be described below.

It is assumed that among twenty codes printed on the card 1, sixteen codes are dummies. A password is divided into four parts, which are placed in the upper second location, the lower fifth location, the lower sixth location, and the upper ninth location from the left end (see FIG. 6). It is assumed that these four parts are read out in the order of "E-9-2-F".

An authorized user who knows this order uses a handheld or pen-type scanner 2 to sequentially read out the lower fifth location #1, the upper ninth location #2, the upper second location #3, and the lower sixth location #4 as shown in FIG. 7 while ignoring the other code locations. An accessed system receives a restored password of hundreds through thousands of digits and/or characters to identify the authorized user.

Referring to FIGS. 7 and 8, the reference numeral 3 designates a terminal unit, 4 designates a keyboard, 5 designates a communication network such as Internet, 6 designates a central control computer, and 7 designates data.

Next, the third embodiment and the fourth embodiment will be described below.

Figure 9:
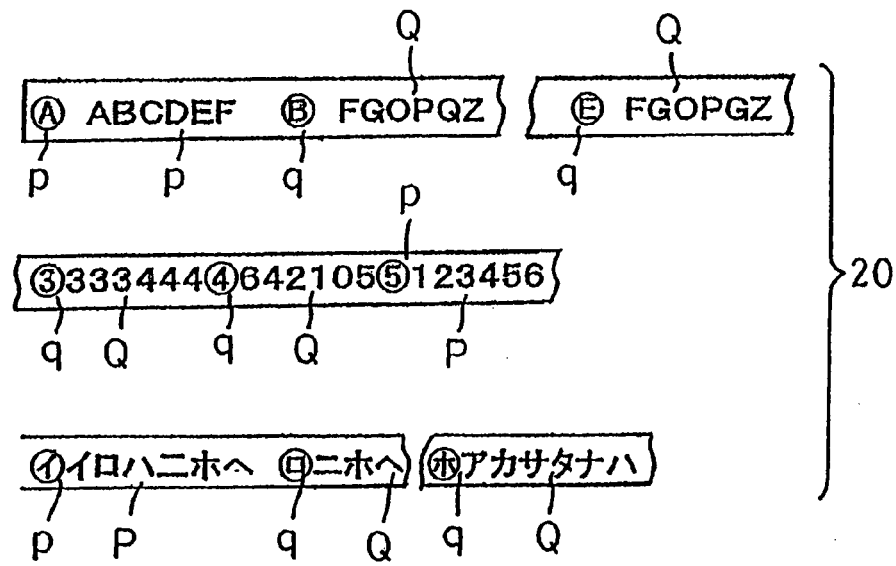
FIG. 9 is an explanatory drawing of encrypted information.

Encrypted information 20 in FIG. 9 is divided into three items of true information P1, P2, P3, which are interspersed among items of false information Q1, Q2, . . . to conceal the true information. Thus, the false information Q and the true information P cannot be discriminated from their appearances.

The items of true information P1, P2, P3 are assigned 5, A, and イ (a katakana character) as items of address information p (true data) and the other items of false information Q1, Q2, . . . are assigned numbers other than 5, alphabetic characters other than A, and katakana characters other than イ as items of address information q (false data).

Figure 10:
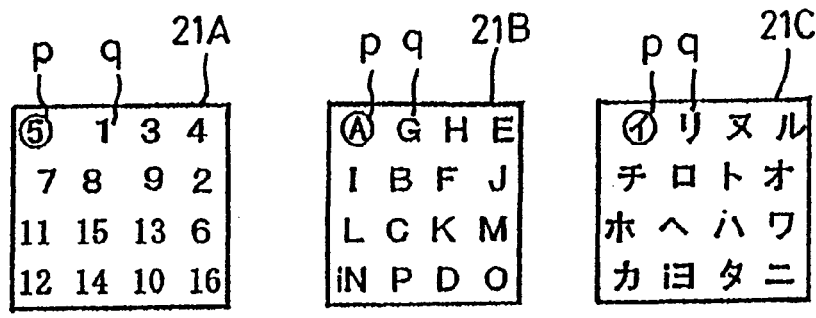
FIG. 10 is an explanatory drawing of address cards.

Referring to FIG. 10, both the items of true data P and the items of false data Q are placed on address cards 21A, 21B, and 21C.

Then the user selects the items of true data 5, A, and from among the items of false data through memory authentication (brain authentication).

To facilitate secure selection of the reading order, these items of data can be colored in red, yellow, and blue.

Figure 11:
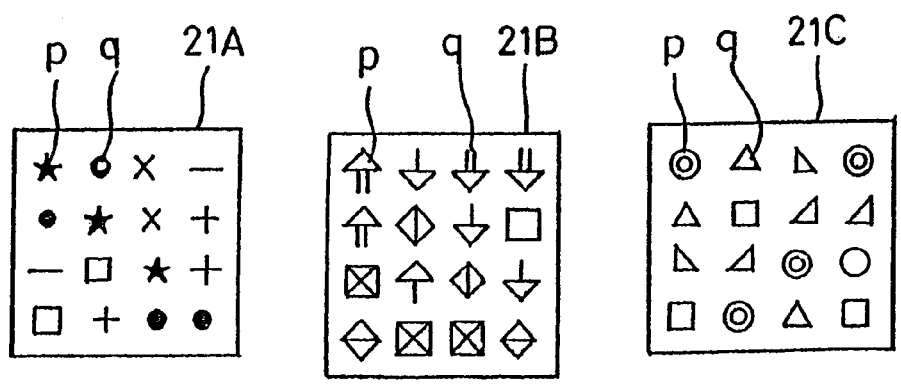
FIG. 11 is an explanatory drawing of address cards including illustrations.

If two-dimensional codes are applied, the embodiments as shown in FIGS. 1 through 4 and FIG. 6 can be used. In addition, as shown in FIG. 11, marks and symbols other than alphanumeric characters can be also used.

It should be noted that the third and fourth embodiments are not limited to optical/printed two-dimensional codes but they are applicable to non-optical/non-printed indexed data blocks and optical/non-optical symbols. The algorithm used for these embodiments is also applicable not only to some items of data printed as two-dimensional codes but to those printed as symbols or to data blocks or symbols which are not printed but indexed and recorded on a storage medium.

The above-described first through fourth embodiments can facilitate input operations of authentication data used for user authentication as well as selection of true authentication data from numerous items of false data, thereby holding it in one's memory more easily. In addition, since the number of items of false data is equal to that of alphanumeric characters, these embodiments can prevent any unauthorized person from decrypting authentication symbols for greater safety. A recording medium storing corporate information and/or personal information can be concealed more securely. Moreover, cryptographic keys for user authentication and secret information such as corporate information and/or personal information can be treated in a more secret manner for online applications and offline applications as well as in recording and storing on a recording medium in a computer itself.

Since the number of items of data is equal to the number of alphanumeric character strings of plural digits, these embodiments can prevent any unauthorized person from decrypting authentication symbols for greater safety. A recording medium storing corporate information and/or personal information can be concealed more securely.

Subsequently, the third through seventh embodiments will be described below.

Figure 12:
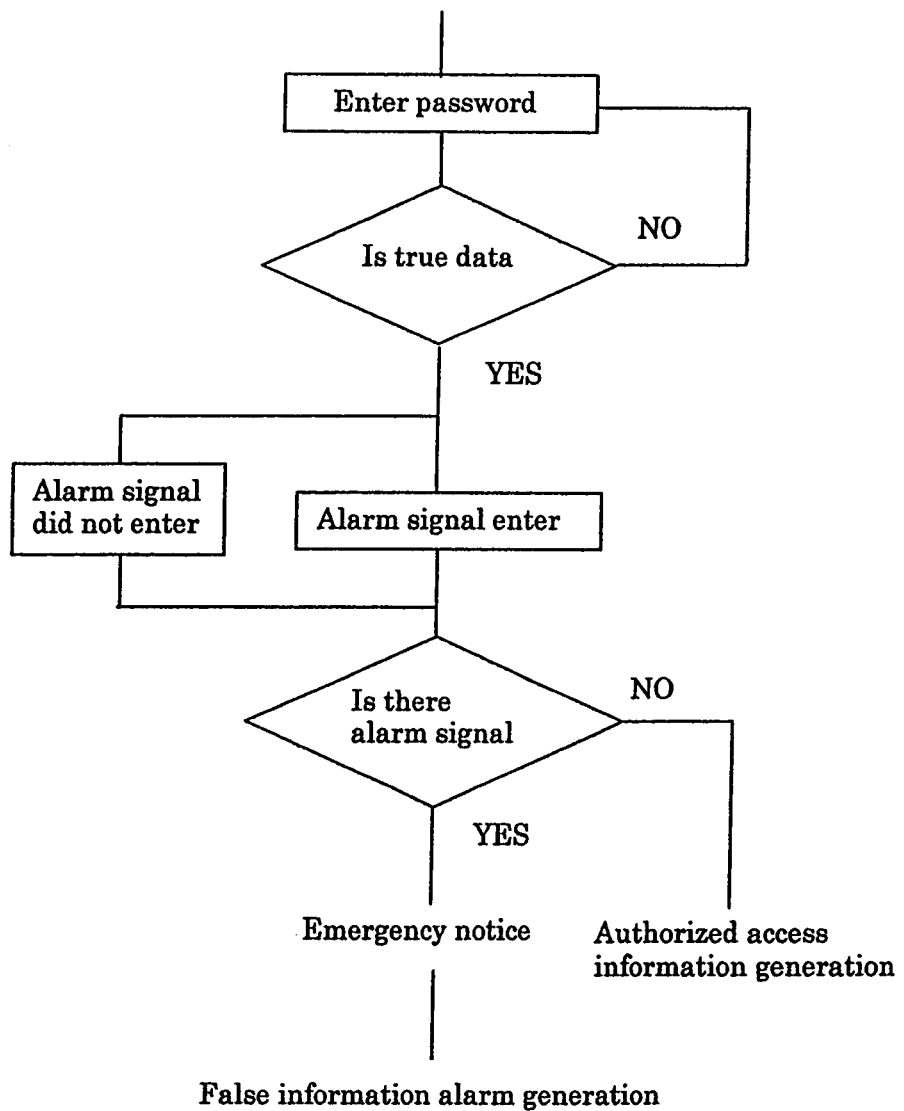
FIG. 12 is a flowchart of the fifth invention.

Referring to a flowchart shown in FIG. 12, ["123947=] is set as a password for user authentication in an internet transaction (or in other cases including the operation of a cash dispenser, user authentication upon a credit, or a key number for opening a key of a doorway, a safe or a case for a recording medium) and an authorized user is informed of this password in advance. Specifically, a password obtained by adding ["] and [=] to the original password [123947], i.e., a password obtained by adding ["] to the first place of the original password [123947] and [=] to the last place thereof, is set as an alarm signal.

The alarm signal may be set irrelevant to the password. For example, the one having ["] at the first place, [=] at the last place and numerical strings between ["] and [=] may be set as the alarm signal (i.e., [123947] in the above-mentioned ["123947=] is changed to numerical strings irrelevant to the password). Further, the position of ["] and the numerical strings between ["] and [=] are composed of optional numerals in optional digit numbers. When randomly selected symbols are assigned to each user as additional signals, this alarm signal cannot be known other than the authorized user. Accordingly, an unauthorized person in bad faith cannot detect the sending of this alarm signal.

During the input operation of a password for the above-mentioned user authentication, the user informs that he or she is placed under the control of an unauthorized person by adding the above-mentioned alarm signal set in advance.

Figure 13:
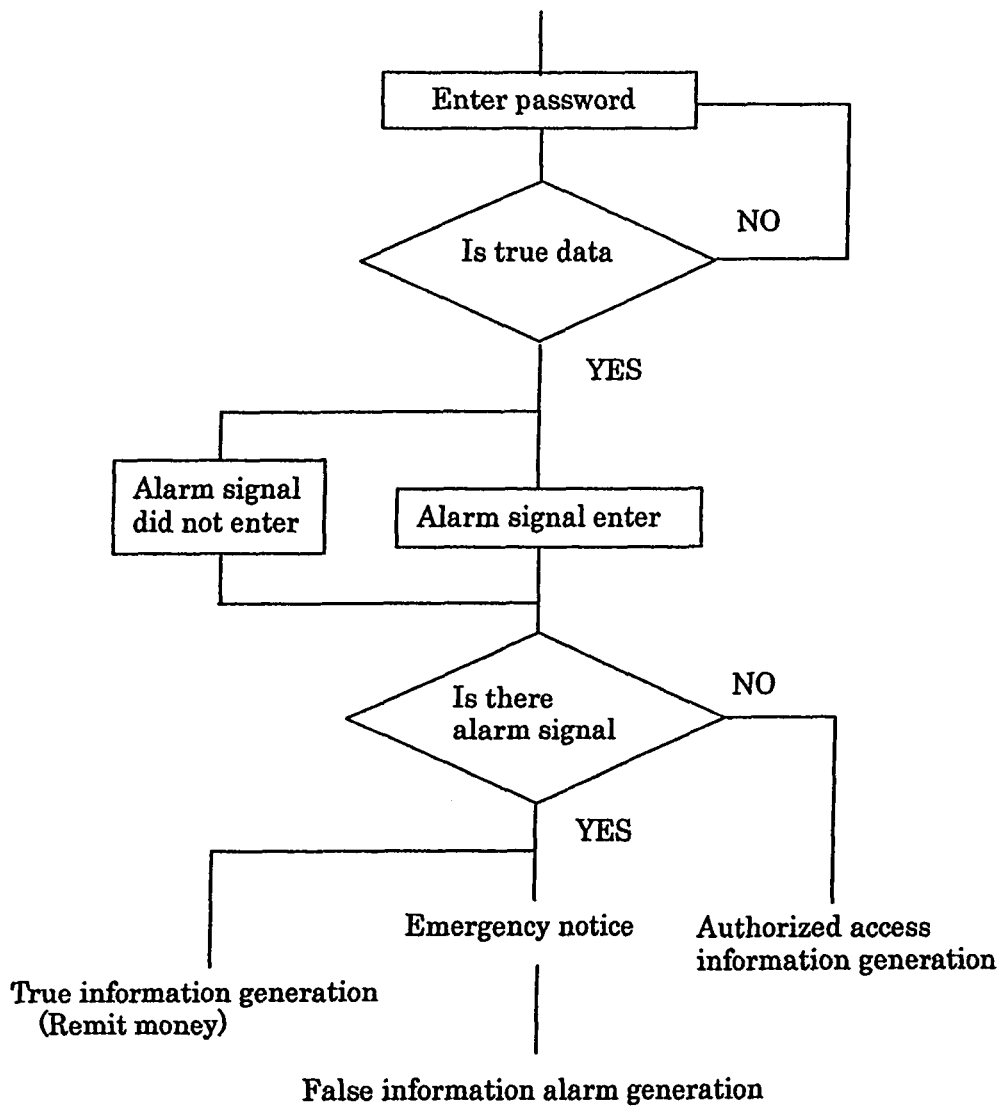
FIG. 13 is a flowchart of the sixth invention.

A system detects that the user is under an abnormal condition by detecting the alarm signal, and it is to perform a protection/preservation measure. In the invention of claim 2 with reference to FIG. 13, the user authentication is completed ignoring the existence of the alarm signal.

As the protection/preservation measure, the system leads the access to a false web page that is prepared beforehand for transmitting information that is similar to but not the same as the true information and does not give great damage to its organization, facility or corporation even if it is leaked.

Even in the case where there is no such preparation and the outflow of true information (for example, remittance instruction or the like) is missed for a safety of user's life and body, the system can promptly set about a user rescue, detection of an invader or complementary activity if it grasps the abnormal condition on real time.

In this case, the system never asks the user the question of "Is there anything abnormal?". The system persistently proceeds the processing, or false processing. Or a danger occurs that the user is immediately exposed to a revenge of the unauthorized person because the user does not follow the instruction.

When a method is applied wherein numerous passwords are divided into plural parts and the one in which false items are interspersed is recorded and printed to any medium so that only the authorized user memorizes the position and restoration order of the true data, this alarm signal can be concealed, thereby enhancing practicability. Specifically, it is enough to together select this data block upon emergency, so that the process can easily be performed even under the tense condition. Similarly, another method can be applied wherein an alarm signal is added or inserted upon sending so-called authentication information other than a password such as decrypted open keys or cryptographic keys.

Further, this software algorithm can be applied not only to the password but also to the other authentication method. In the case of fingerprint authentication, the fingerprint on the third finger of the right hand is, for example, determined as a signal that completes the authentication but alarms the occurrence of the abnormal condition. In the case of signature recognition, a second signature may be registered for this purpose. In case where symbols are used for authentication without using characters or numerals, one or plural symbols may be assigned to each user for this purpose.

Figure 14:
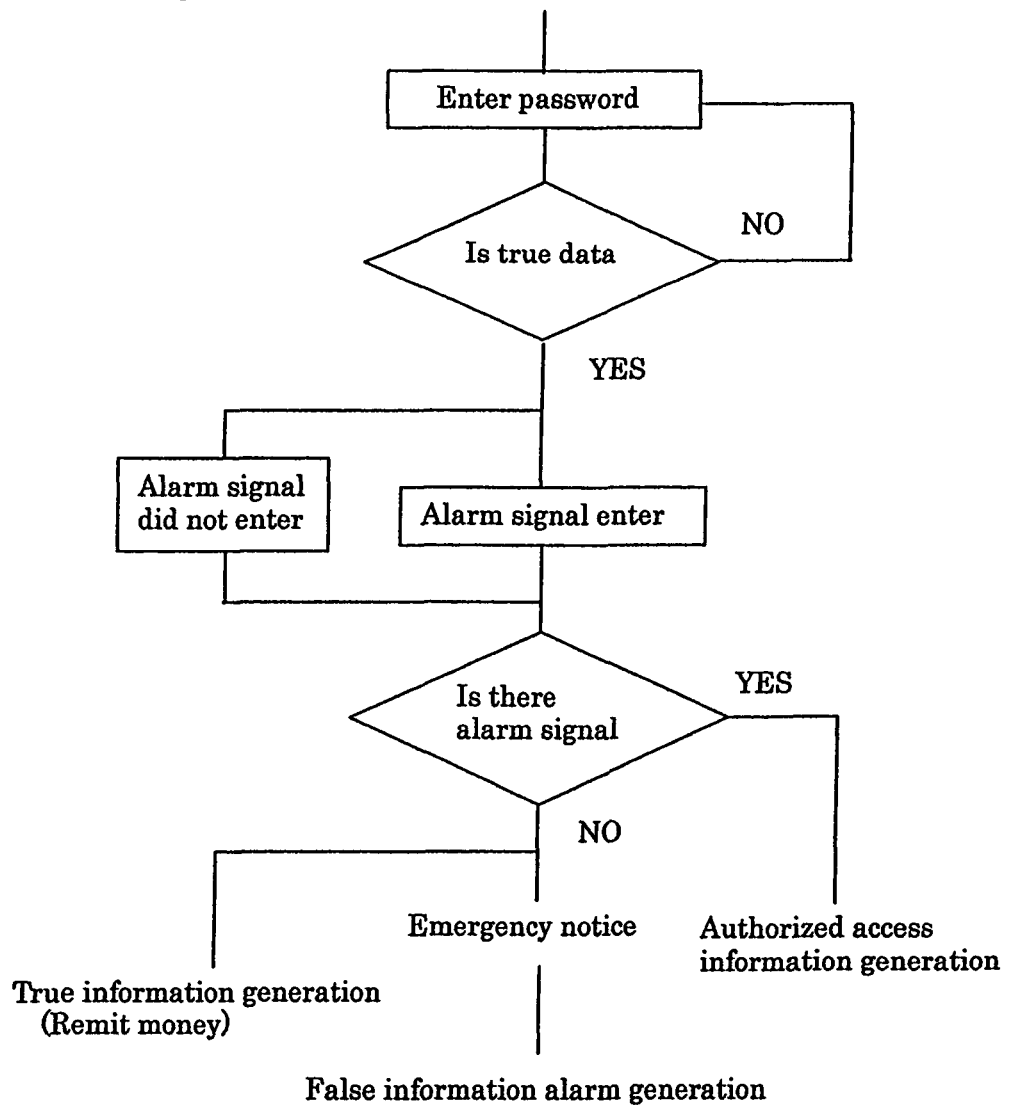
FIG. 14 is a flowchart of the seventh invention.

In the seventh embodiment referring to a flowchart shown in FIG. 14, a user inputs a password by adding an alarm signal set in advance in user authentication in an internet transaction. For example, the user adds [#] to [A1234], i.e., inputs [A1234#]. The user deletes [#] at the end and inputs [A1234] for informing that he or she is placed under the control of unauthorized person. The preservation measure after this is the same as that shown in the fifth embodiment and the sixth embodiment.

The fifth through seventh embodiments detects an access from a user placed under the control of an unauthorized person in bad faith in user authentication in an internet transaction, thereby being capable of protecting and preserving both the user and the system. Providing the alarm signal continued from the original password assuredly specify a sender of the alarm signal and further reduces "prank sending" or "miss-sending" of the alarm signal. Moreover, specifying an alarm signal every user can reduce "prank sending" or "miss-sending" of the alarm signal.

Now, the eighth through tenth embodiments will be described below.

Figure 15:
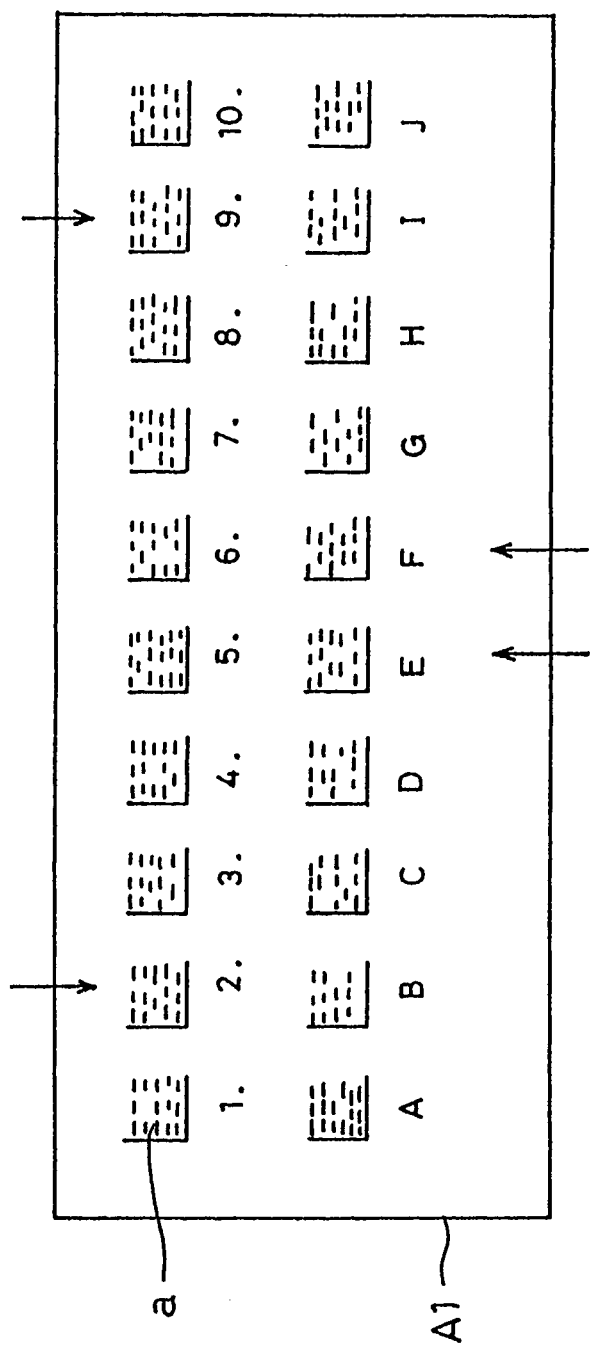
FIG. 15 is an explanatory drawing of a user authentication data recording card.

FIG. 15 shows a user authentication data recording card A1 as a user authentication data recording medium used with the present invention and numerous items of matching data a such as kanji character strings, alphanumeric character strings, image and/or audio data are two-dimensionally coded and recorded on the data recording card through recording means which is capable of optically and/or magnetically reading data.

Figure 16:
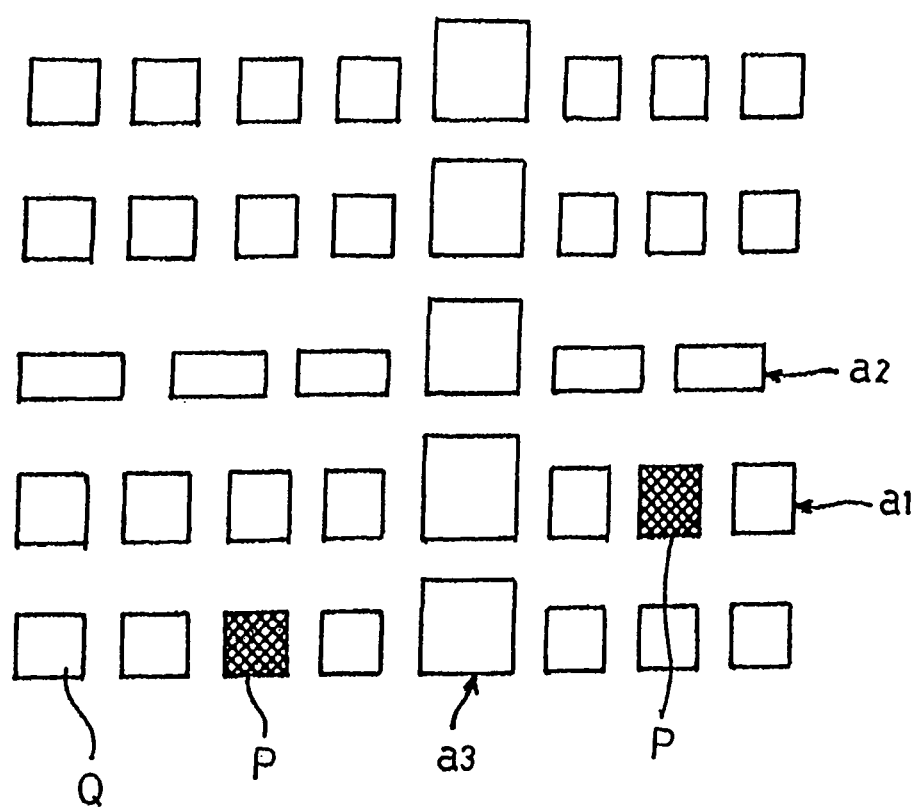
FIG. 16 is an explanatory drawing of a user authentication data recording card for an embodiment which uses matching data of different shapes.

FIG. 16 shows matching data in different shapes a1, a2, a3.

Figure 17:
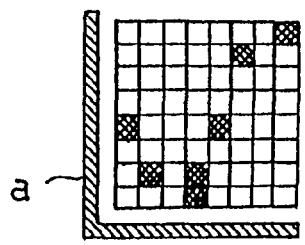
FIG. 17 is an explanatory drawing of user authentication data recording cards for showing an embodiment in which two-dimensionally coded data is recorded.
Figure 17:
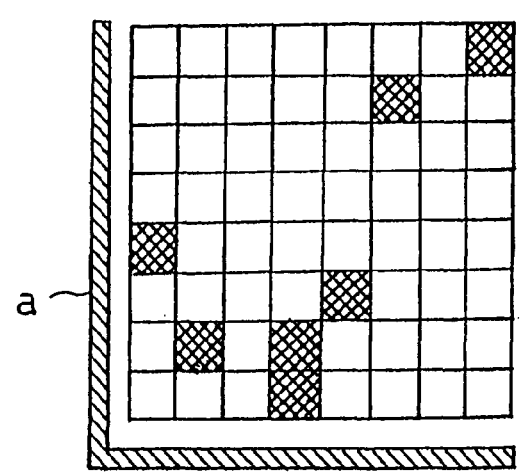
Figure 17:
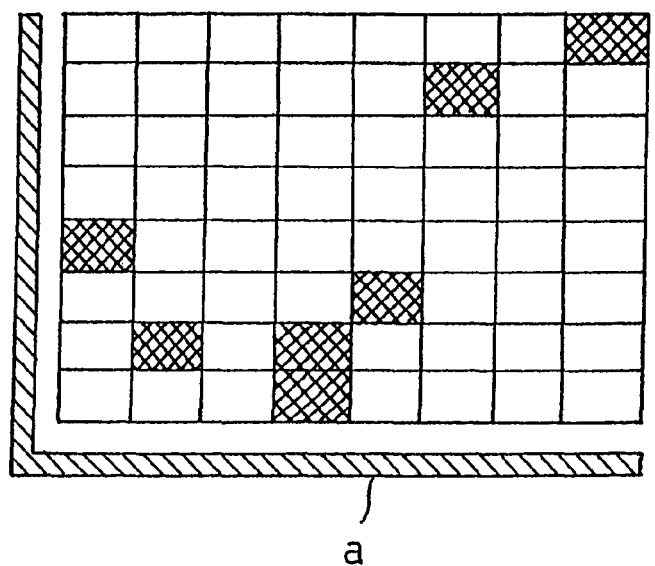

FIG. 17 shows matching data printed by a computer-controlled printer or magnetically recorded and the two-dimensional coding as shown in the figure can allow for recording identical data irrespective of data shapes. In addition, the two-dimensional coding can make it difficult to discriminate visibly recorded data items because they are printed in substantially identical appearances.

It should be noted that the present invention is not limited to the two-dimensional codes as described above and one-dimensional codes, symbols including illustrations and caricatures, alphanumeric character strings, kanji character strings, words and phrases can be used as matching data. Therefore, matching data may include character strings and image and/or audio data which can be manipulated by a computer for matching operations.

A recording medium of the user authentication data recording card A1 may be a portion of an optically readable printing card or a magnetically recording area formed on a portion of a card such as a credit card. Alternatively, the data recording card may be an electrically recording medium such as an IC card.

Figure 18:
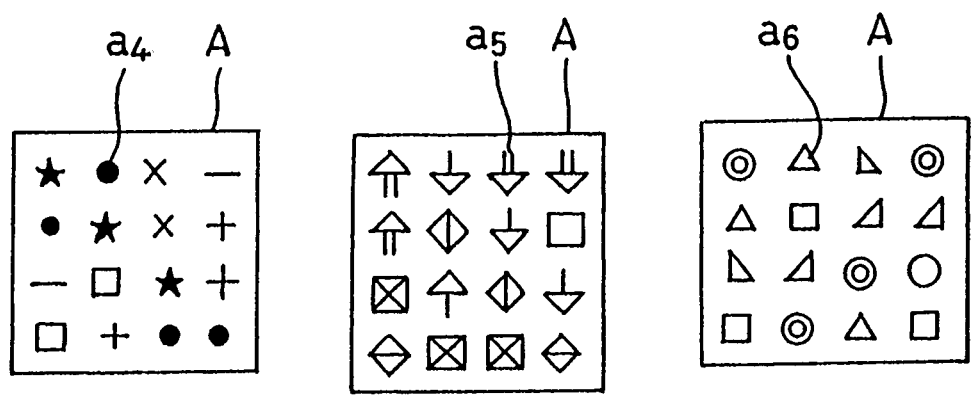
FIG. 18 is an explanatory drawing of user authentication data recording cards for showing an embodiment in which marks and symbols are used as matching data.

FIG. 18 shows matching data [marks and symbols (a4, a5, a6) being called matching data] electronically recorded on an electric recording medium, illustrating an embodiment of the user authentication data recording medium 1 on which three display surfaces are electronically recorded, the three display surfaces comprising a display surface A21 of matching data (a4) group of marks and symbols, display surface A22 of matching data (a5) group of marks and symbols, and display surface A23 of matching data (a6) group of marks and symbols.

Before issuing the above-described user authentication data recording medium 1 to each user, a single or plural items of true data P are determined from numerous items of matching data a and all the remaining items of matching data are determined to be plural items of false data Q, and then the matching data consisting of the single or plural items of true data and the plural items of false data are recorded on the user authentication data recording medium. It should be noted that when plural items of true data P are used, the order of reading the items of true data P is also determined. For example, as shown in FIG. 12, the items of true data are determined to be P1=E, P2=9, P3=2, and P4=F to complete the user authentication data recording medium 1 (user authentication data recording card A1) as a matching card.

The location of an item of true data or the locations and the reading order of plural items of true data in the user authentication data recording medium 1 (user authentication data recording card A1) are determined and recorded in a recording unit of a CPU or central control computer 6 to allow the computer to perform a matching operation for authentication data recorded on the user authentication data recording medium 1 (user authentication data recording card A1) presented by a holder thereof.

Next, a process of entering authentication data on a user authentication data recording medium 1 (user authentication data recording card A1) will be described below.

Figure 19:
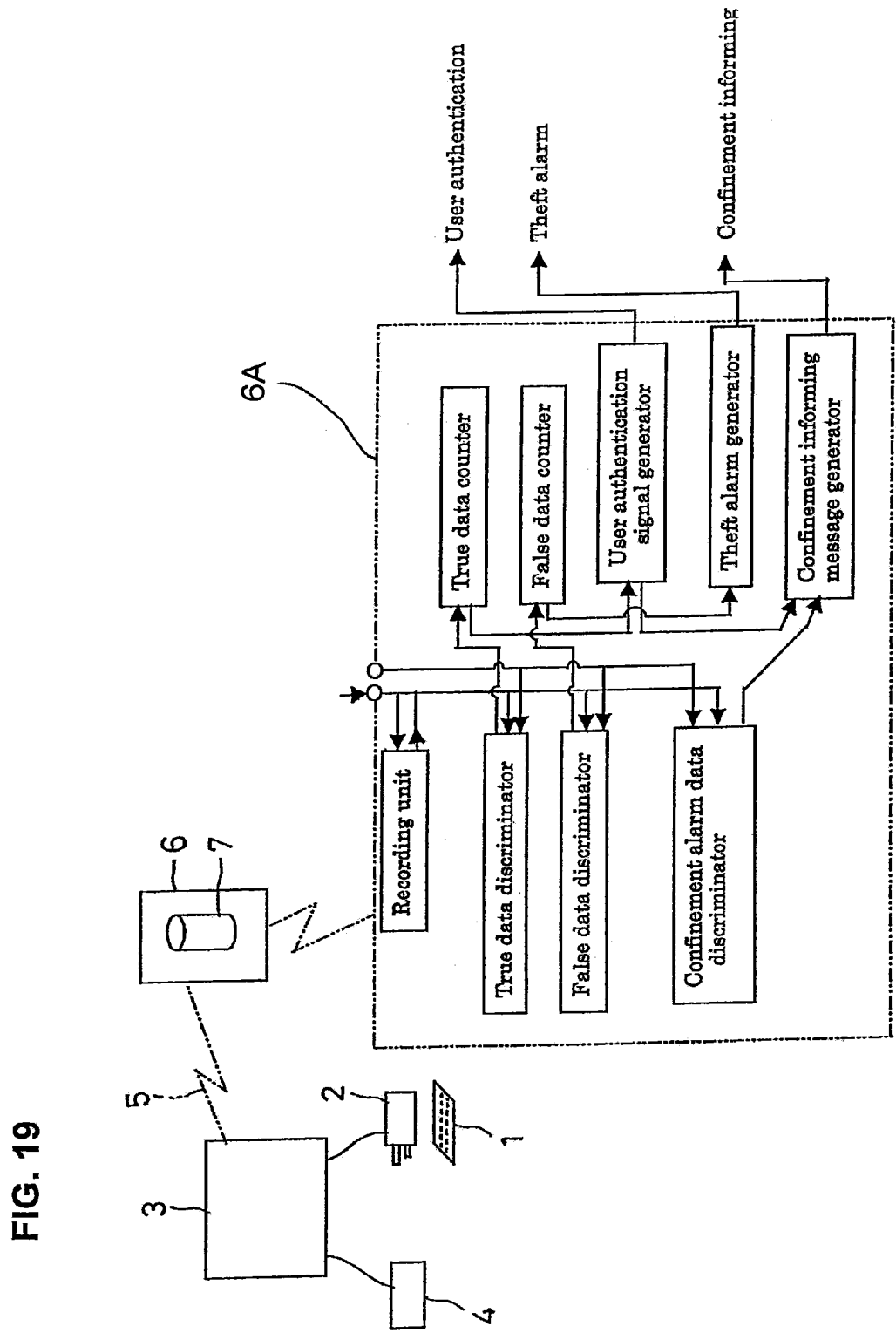
FIG. 19 is an explanatory drawing of reading means for matching data in the second embodiment and also shows the functions of a control computer.

Referring to FIG. 19, the authentication data on the user authentication data recording medium 1 (user authentication data recording card A1) as shown in FIG. 15 is entered into a terminal unit 3 through a pen-type scanner 2 and then transmitted directly or through a communication line (Internet) to a CPU connected to the terminal unit.

For each authorized user, four predetermined items of data among the twenty items of matching data are entered in a particular order. More specifically, the lower fifth item #1, the upper ninth item #2, the upper second item #3, and the lower sixth item #4 are read out in this order. These items of data are alphanumeric characters "E-9-2-F" as shown in FIG. 15. The handheld scanner 2 reads all the items of data on the user authentication data recording medium 1 and then items of authentication data selected through selective input means such as a keyboard 4 are transmitted to the CPU or central control computer 6 via the terminal unit 3.

In addition to the recording unit described above, the CPU or central control computer 6 includes a true data discriminator, a false data discriminator, a confinement informing data discriminator, a true data counter, a false data counter, a user authentication signal generator, a theft alarm (unauthorized access alarm) generator, and a confinement informing message generator.

Figure 20:
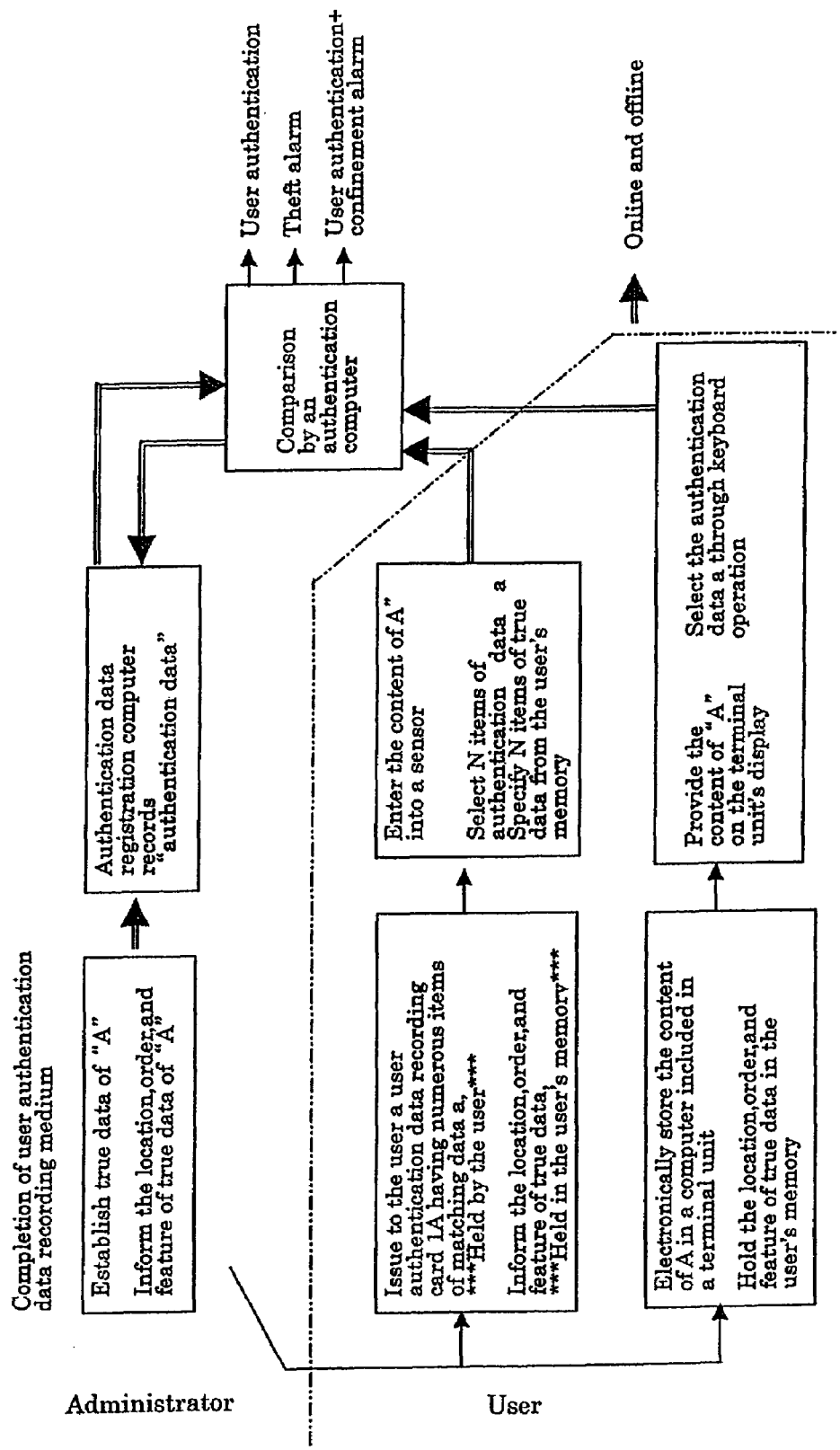
FIG. 20 is an explanatory drawing for showing the system operation of an emergency conditions informing system according to the eighth through tenth embodiments.

The operation performed by the CPU or control computer 6 to transmit the authentication data as described above will be described below with reference to an operational flow explanatory drawing of FIG. 20 and a flowchart of FIG. 8.

Figure 21:
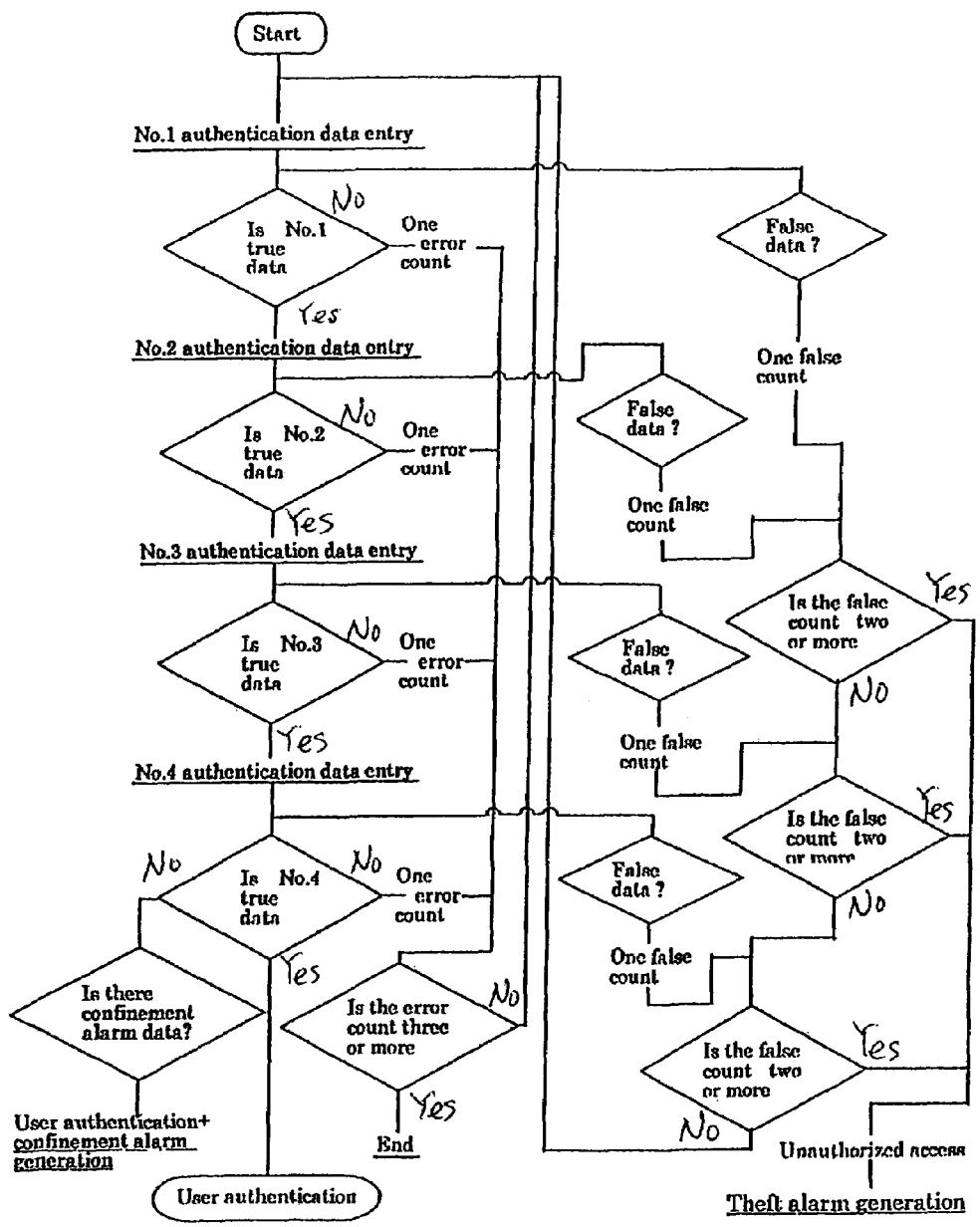
FIG. 21 is a flowchart for showing the same system operation as shown in FIG. 21.

When four particular items of data are entered in a particular order (for example, the user authentication data recording medium 1 in FIG. 15 is used to enter the four items of true data P1=E, P2=9, P3=2, and P4=F in the order of "E-9-2-F"), the process goes on as shown by the left-hand flow in FIG. 21. Namely, steps S1, S2, S3, and S4 are performed in this order to complete a user authentication operation successfully.

If any item of true data is entered in an incorrect order (any item of false data is entered or any item of data which does not exist in the user authentication data (noise data) is entered), this is considered as an authentication error to cause a branch at any of the steps S1, S2, S3, and S4, resulting in a user authentication failure. Then, if the error count exceeds a predetermined value, for example, three at step S5, the authentication access is terminated. If the error count is less than the predetermined value, for example, it is two or less, another authentication access may be permitted.

If items of false data are entered, the process goes on as shown by the central flow in the figure and steps S6, S7, S8, and S9 are performed in this order to store the items of false data in the recording means of the CPU or computer 6, counting the entered items of false data.

If the false data count is two or more, a branch is caused at any of steps S10, S11, and S12 to detect an "unauthorized access".

If the false data count is one during four input operations, this is considered as a "misoperation" to allow for entering matching data again.

As an alternative to the method of interspersing predetermined items of true data among items of false data as described above, a user authentication recording medium with numerous items of matching data a, irrespective of whether these items are true or false (that is, without predetermined items of true and false data) may be given to a user to allow the user to select some items of true data from among them with the remaining items to be assumed as those of false data. Namely, the user may be given a temporary right to select items of true and false data and also items of confinement informing data.

If a particular one among numerous items of false data is determined as an item of "alarm data" and such an item of alarm data is entered after the steps S1, S2, S3, and S4 have been performed in this order to complete the user authentication operation successfully (namely, after the four items of true data have been entered), a user authentication and confinement informing message is generated and transmitted upon detection of any item of "confinement informing data" at step S13.

Figure 22:
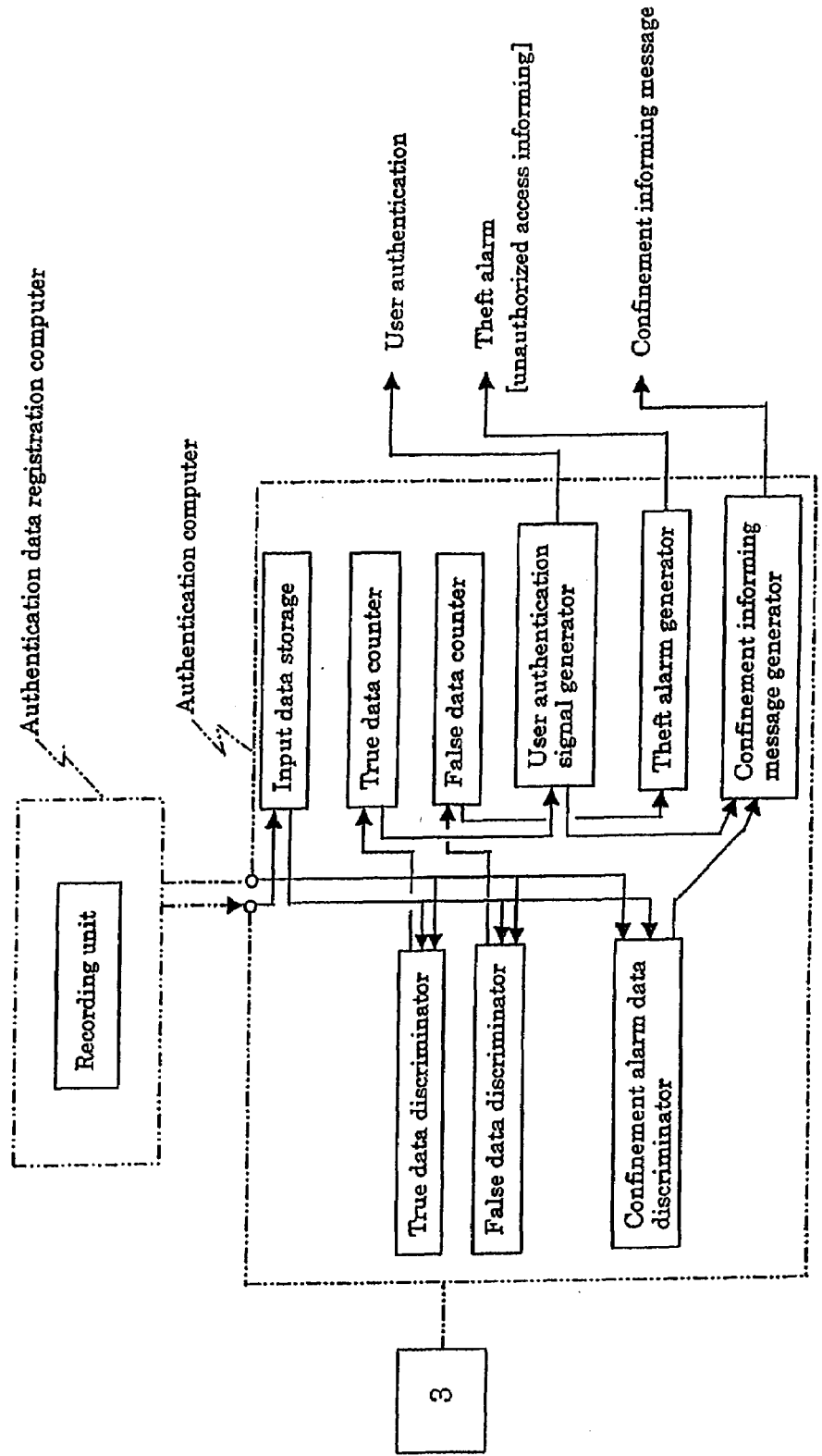
FIG. 22 is an explanatory drawing for showing the embodiment of the tenth invention in a similar manner to FIG. 19.
Figure 23:
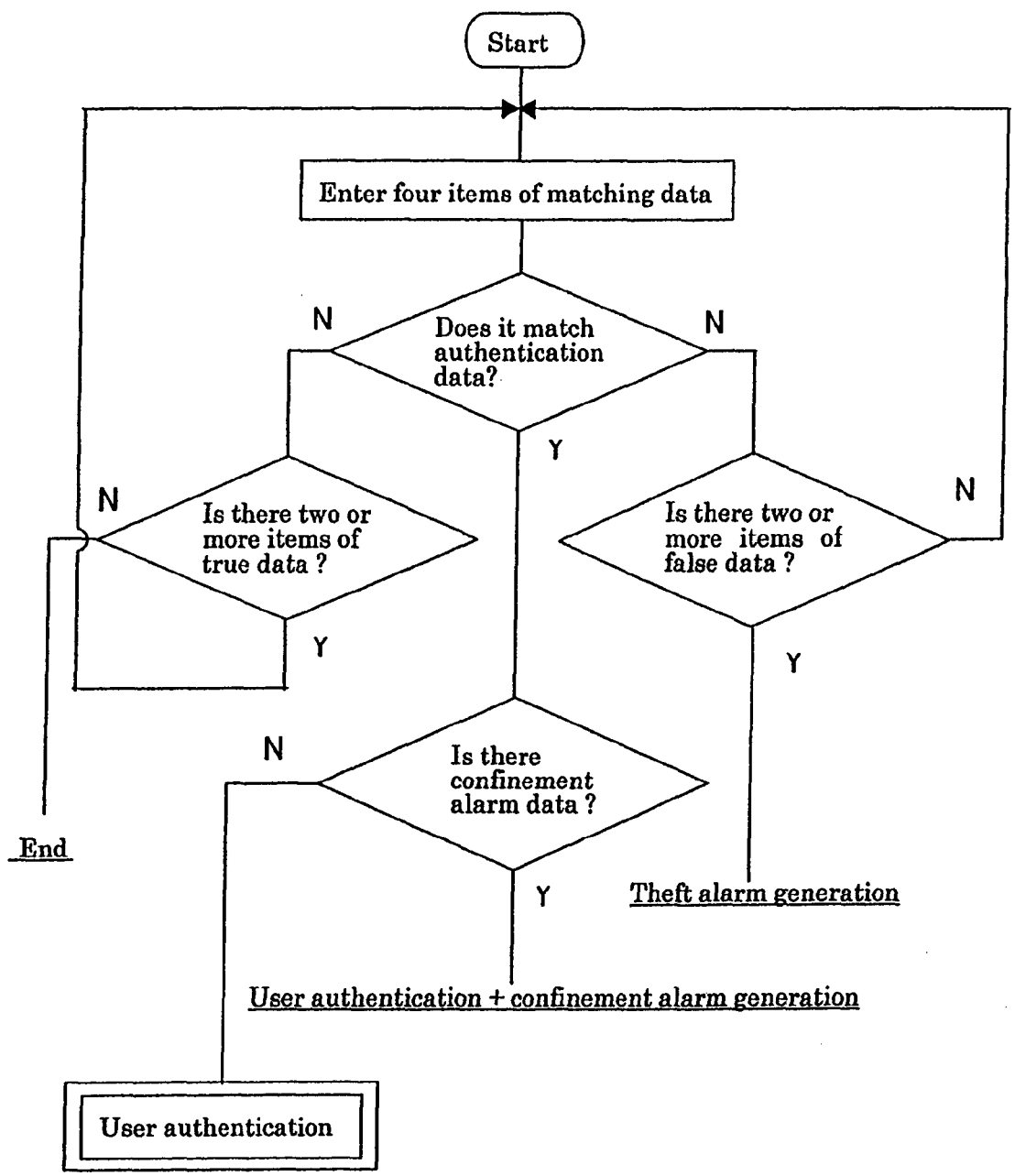
FIG. 23 is a flowchart for showing the seventh embodiment of the tenth invention.

In an embodiment shown in FIGS. 22 and 23, all items of data recorded in a user authentication data recording medium 1 (user authentication data recording card A1) can be read by a card reader and then items of authentication data selected by selective input means such as a keyboard can be transmitted to a CPU or central control computer 6 via a terminal unit 3. Alternatively, as described below, a computer included in an electronic device terminal unit may be used to electronically record the content of a user authentication data recording medium (user authentication data recording card A) as well as to record it in a control center (authentication data registration computer) online or offline, so that matching data strings entered as authentication data based on the user-transmitted record can be entered in a control center (authentication computer) online or offline for matching the authentication data. It should be noted that alphanumeric characters, binary comparison, image comparison, and other data comparison techniques may be used for matching.

Referring to FIG. 19, a CPU or central control computer 6A in a control center (authentication data registration computer) has an input data storage in addition to the functional means as shown in FIG. 5 for the first embodiment [the true data discriminator, the false data discriminator, the confinement informing data discriminator, the true data counter, the false data counter, the user authentication signal generator, the theft alarm (unauthorized access alarm) generator, and the confinement informing message generator].

The operation performed by the CPU or control computer 6A to transmit the authentication data as described above will be described below with reference to a flowchart of FIG. 10.

When four particular data are entered in a particular order (for example, the user authentication data recording medium 1 in FIG. 12 is used to enter the four items of true data P1=E, P2=9, P3=2, and P4=F in the order of "E-9-2-F") and authentication data in a recording unit matches the authentication data in the input data storage, it is determined that true authentication data is entered to complete a user authentication operation successfully. If the authentication data in the recording unit does not match the authentication data in the input data storage (any item of true data is entered in an incorrect order or any item of false data is entered or any item of data which does not exist in the user authentication data (noise data) is entered), this is considered as an authentication error, resulting in a user authentication failure.

Then, if the false data count is less than a predetermined value, for example, it is one or less, another authentication access may be permitted.

If the false data count is equal to or more than the predetermined value, for example, it is two or more, this is considered as an "unauthorized access" to generate a theft alarm.

If a particular one among numerous items of false data is determined as an item of "alarm data" and such an item of alarm data is entered after the user authentication operation has been completed successfully (namely, after the four items of true data have been entered), a user authentication and confinement informing message is generated and transmitted upon detection of any item of "confinement informing data".

If the content of a user authentication data recording medium is recorded in a recording unit of a computer built in a mobile telephone or portable terminal unit, recording means in a portable electronic device can be used to allow the control center to issue a user authentication data recording medium by recording similar information to that in a user authentication data recording card, that is, numerous items of matching data a, in the recording means of the portable electronic device, determining items of true data P from the items of matching data a, and determining and recording authentication data for a holder of the portable electronic device in the recording means of the portable electronic device and a computer in the control center.

During a user authentication operation, the numerous items of matching data a are provided on a display of the portable electronic device to allow the user to specify the locations of the items of true data P from the user's memory for transmitting them to the control center (authentication data registration computer). If any item of false data Q is transmitted, it will be informed or alarmed that the portable electronic device (such as a mobile telephone or an entrant authentication device) may be lost or stolen. If any item of "confinement informing data" is detected, a user authentication and confinement informing message will be generated and transmitted.

To specify the locations of the items of true data P, a keyboard (including a ten key pad or a dial), a touch screen, or other computer input means may be used. For an application wherein a user authentication operation must be performed offline without any communication to the control center, a single device may include all functions to be performed by the computer in the authentication data registration center as well as the authentication computer shown in FIG. 19. For example, an entrant controller can unlock a door to permit someone to enter the room only through user authentication without any communication to an external computer. However, such a controller can be set to generate and transmit a theft alarm or confinement informing message through communication means for online communication to security.

Particularly, under circumstances where a user confinement informing message is required, a communication to security in addition to permission to enter the room and operate an electronic device may be effective for both user rescue and security of the electronic device and the electronic device control room.

The eighth invention uses a single item of true data P. As soon as an item of false data Q is detected, a loss or theft is informed or alarmed.

The ninth invention uses plural items of true data P and generates an alarm upon detection of plural items of false data Q, thereby reducing erroneous alarms due to input mistakes.

In addition to the features of the eighth and tenth invention, the invention can generate and transmit a confinement informing message upon detection of any item of "confinement informing data". Therefore, when the fifth or sixth embodiment is implemented, the additional feature to generate and transmit a confinement informing message upon detection of any item of "confinement informing data" as shown in FIG. 23 can be omitted.

The eighth through tenth inventions can use a user authentication data recording medium 1 on which numerous similar items of matching data are recorded, and these embodiments can also select items of true data from among the numerous similar items of matching data from a user's memory to securely prevent an unauthorized person from making a user authentication request based on authentication data. If the authentication data to be transmitted includes an item of false data, generation of a theft alarm can enhance the feature to prevent an unauthorized access through a lost or stolen user authentication data recording medium.

Furthermore, as same as inventions above, these inventions can be effective for protecting and preserving both the user and the system against access from the user, if the user is placed under the control of an unauthorized person in bad faith.

Industrial Applicability

The present invention provides means for concealing, recording, and storing secret information such as corporate information and technical information. The present invention also establishes an alarm system as a safety measure to be taken when secret information with cryptographic keys, a recording medium including such secret information, or an electronic and/or communication device having such a recording medium is thieved or lost, or fraudulently used by means of leaked authentication data. The present invention further establishes a system for informing that there occurs an unauthorized access to a restricted area or electronic device. In addition, the present invention can detect access from an authorized user placed under the control of an unauthorized person in bad faith to allow for protection and preservation of both the user and the system. Therefore, the present invention is very useful in industrial fields where a secret information recording medium which has secret information with cryptographic keys recorded thereon, such as an authentication card, is used.

The invention claimed is:

1. A method for reporting an emergency such as theft or confinement based upon authentication data recorded in a user authentication data recording medium in a user authentication system comprising:

recording a user authentication data recording medium with authentication data so that when matching data inputted by an input operation of an authenticated person matches between an authentication terminal unit having said user authentication data recording medium therein and an authentication control side unit, then authentication is completed, interspersing a plurality of matching data comprised of plural items of true data and plural items of false data, said true and false data comprising two dimensional code data, said matching data is selected from the group consisting of symbols, graphics pictures and photos;

upon recording said plurality of matching data on said recording medium, a person to be authenticated determines true data by way of selecting plural items of locations or characteristics and orders out of the plurality of matching data and selects from remaining items of the plurality of matching data to be false data and further determines a part of the false data to be confinement informing data; and executing using an authentication computer following actions of:

upon inputting data from the user authentication data recording medium, if plural items of true data are selected from the user authentication data recording medium in a correct order, then determining that true authentication data is selected and then validating the user authentication;

upon inputting data from the user authentication data recording medium, if a selected number of items of false data is less than a predetermined number, permitting another authentication access to be made; and if the selected number of items of false data is equal to or more than the predetermined number, determining that a theft-causing unauthorized access is attempted, invalidating the user authentication, and generating a theft alarm, and further by means of a control center which detects the generated theft alarm preventing subsequent use of said user authentication data recording medium; and upon inputting data from the user authentication data recording medium, if plural items of true data are selected from the user authentication data recording medium in a correct order, and if at least one confinement informing data is included in the selection, then determining that true matching data are selected, thus validating user authentication, and further by means of said control center, determining that the user is placed under a control of an unauthorized person and generating a confinement informing alarm, and further, with a false data counter and a true data counter provided in said authentication computer, upon failure of authentication, if the selected number of items of false data among inputted authentication data is less than a predetermined number, permitting another authentication access to be made, thus determining, based upon presence of true and correct data including selection order error, high probability of user authentication.

2. A method for reporting an emergency such as theft or confinement based upon authentication data recorded in a user authentication data recording medium in a user authentication system comprising:

recording a user authentication data recording medium with authentication data so that when matching data inputted by an input operation of an authenticated person matches between an authentication terminal unit having said user authentication data recording medium therein and an authentication control side unit, then authentication is completed, interspersing a plurality of matching data comprised of plural items of true data and plural items of false data, said true and false data comprising two dimensional code data, said matching data is selected from the group consisting of symbols, graphics pictures and photos;

upon recording said plurality of matching data on said recording medium, a person to be authenticated determines true data by way of selecting plural items of locations or characteristics and orders out of the plurality of matching data and selects from remaining items of the plurality of matching data to be false data and further determines a part of the false data to be confinement informing data; and executing using an authentication computer following actions of:

upon inputting data from the user authentication data recording medium, if plural items of true data are selected from the user authentication data recording medium in a correct order, then determining that true authentication data is selected and then validating the user authentication;

upon inputting data from the user authentication data recording medium, if a selected number of items of false data is less than a predetermined number, permitting another authentication access to be made;

upon inputting data from the user authentication data recording medium, if plural items of true data are selected from the user authentication data recording medium in a correct order, and if at least one confinement informing data is included in the selection , then determining that true matching data are selected, thus validating user authentication, and further by means of said control center, determining that the user is placed under a control of an unauthorized person and generating a confinement informing alarm;

upon inputting data from the user authentication data recording medium, if the selected number of items of false data included in the input data is equal to or more than the predetermined number, determining that a theft-causing unauthorized access is attempted, invalidating the user authentication, and generating a theft alarm, and further by means of a control center which detects the generated theft alarm preventing subsequent use of said user authentication data recording medium;

and further, with a true data counter provided in said authentication computer, upon failure of authentication, if the selected number of items of inputted authentication data is greater than a predetermined number, permitting another authentication access to be made, and processing on error input occurring at authentication failure is distinguished by a generation of alarm made upon a predetermined number of input of false data that is likely to be caused by authentication by others, and a permission of another authentication operation made upon an error in selection order of true data that is likely to be caused by user authentication.

3. The method for reporting an emergency such as theft or confinement according to claim 1, wherein the number of said authentication data (password) is set to be four; and a theft alarm is generated when two or more the false data are inputted, and another authentication access is made possible when two or more true data are inputted.

* * * * *